US012625784B1

(12) United States Patent
Kaushik et al.

(10) Patent No.: US 12,625,784 B1
(45) Date of Patent: May 12, 2026

(54) MIGRATING DATA USING VOLUME CLONES IN A DISTIBUTED STORAGE SYSTEM

(71) Applicant: NetApp, Inc., San Jose, CA (US)

(72) Inventors: Akhil Kaushik, San Jose, CA (US); Gururaj Jayaram Melinamane, Bangalore (IN); Sumith Makam, Bangalore (IN); Pragyan Anand Maharana, Bengaluru (IN); Nandhini Venkataraman, TamilNadu (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/941,022

(22) Filed: Nov. 8, 2024

(51) Int. Cl.
G06F 11/20          (2006.01)
G06F 11/14          (2006.01)
G06F 11/1446        (2026.01)

(52) U.S. Cl.
CPC ........ *G06F 11/203* (2013.01); *G06F 11/1466* (2013.01); *G06F 11/2076* (2013.01)

(58) Field of Classification Search
CPC .... G06F 16/273; G06F 16/275; G06F 16/119; G06F 16/178
See application file for complete search history.

(56) References Cited

U.S. PATENT DOCUMENTS 10,552,071 B1 *   2/2020   Haravu ................. G06F 3/0656
11,487,628 B1 *  11/2022   Matze .................... G06F 3/065

2015/0169415 A1 *   6/2015   Hildebrand ......... G06F 11/1425
                                                            714/4.5
2017/0147601 A1 *   5/2017   Kaushik .............. H04L 67/1095
2021/0326218 A1 *  10/2021   Rachapudi .......... G06F 11/3006
2022/0318104 A1 *  10/2022   Bhargava ............ G06F 11/2069
2024/0231706 A1 *   7/2024   Matsushita ............. G06F 3/065

FOREIGN PATENT DOCUMENTS

WO        WO-2017147101 A1 *   8/2017   ......... G06F 11/1446

OTHER PUBLICATIONS

"ONTAP 8.3—Cluster Management Lif Migration." Reddit, 2014, www.reddit.com/r/netapp/comments/31ngu4/ontap_83_cluster_management_lif_migration/. (Year: 2014).*

* cited by examiner

*Primary Examiner* — Ashish Thomas
*Assistant Examiner* — Catherine Marie Nguyen
(74) *Attorney, Agent, or Firm* — Jaffery Watson Hamilton & DeSanctis LLP

(57)          ABSTRACT

Systems and methods are provided for data migration including cloning a multiple-logical unit number (LUN) volume into a plurality of cloned single-LUN volumes on a first storage node of a computing system; creating a plurality of new volumes on a second storage node of the computing system based at least in part on the plurality of cloned single-LUN volumes; selectively copying snapshot data from the plurality of cloned single-LUN volumes to the plurality of new volumes; establishing snapshot mirror relationships between the plurality of cloned single-LUN volumes and the plurality of new volumes; synchronizing the plurality of cloned single-LUN volumes and the plurality of new volumes; and performing a migration of data logical interface failovers (LIFs) from the plurality of cloned single-LUN volumes to the plurality of new volumes.

20 Claims, 9 Drawing Sheets

802

CLONE MULTIPLE-LUN VOLUME INTO MULTIPLE
SINGLE-LUN VOLUMES ON FIRST NODE

804

CREATE NEW VOLUMES ON SECOND NODE BASED
ON CLONED SINGLE-LUN VOLUMES OF FIRST NODE

806

SELECTIVELY COPY SNAPSHOT DATA FROM
CLONED SINGLE-LUN VOLUMES TO NEW VOLUMES

808

ESTABLISH ASYNCHRONOUS SNAPSHOT
MIRROR RELATIONSHIPS BETWEEN CLONED
SINGLE-LUN VOLUMES AND NEW VOLUMES

810

SWITCH FROM ASYNCHRONOUS SNAPSHOT
MIRROR RELATIONSHIPS TO ACTIVE SYNCHRONOUS
SNAPSHOT MIRROR RELATIONSHIPS

812

SYNCHRONIZE CLONED SINGLE-LUN
VOLUMES AND NEW VOLUMES

814

PERFORM NON-DISRUPTIVE CROSS CLUSTER MIGRATION
OF DATA LOGICAL INTERFACE FAILOVERS AND PORT NUMBERS
FROM CLONED SINGLE-LUN VOLUMES TO NEW VOLUMES

FIG. 8

800

MIGRATING DATA USING VOLUME CLONES IN A DISTIBUTED STORAGE SYSTEM

BACKGROUND

Various embodiments of the present disclosure generally relate to storage systems. At least some embodiments relate to the implementation and use of disaggregated storage space of a storage pod by a distributed storage system having a disaggregated storage architecture and migrating data from one version of the distributed storge system to another version.

Distributed storage systems generally take the form of a cluster of storage controllers (or nodes in virtual or physical form). As a result of sub-optimal infrastructure architectures, prior scale-out storage solutions do not effectively utilize all three vectors of infrastructure (i.e., compute, network, and storage). For example, as shown in FIG. 5, each node of a distributed storage system may be associated with a dedicated pool of storage space (e.g., a node-level aggregate representing a file system that holds one or more volumes created over one or more RAID groups and which is only accessible from a single node at a time), thereby creating storage silos.

When transitioning usage from the distributed storage system shown in FIG. 5 to a distributed storage system having a disaggregated storage architecture, data migration issues may arise.

SUMMARY

Systems and methods are described for implementation and use of disaggregated storage of a storage pod by a distributed storage system. According to one embodiment, a disaggregated storage space is created within a storage pod that includes a group of disks containing multiple Redundant Array of Independent Disks (RAID) groups by dividing storage space of the group of disks into multiple allocation areas (AAs). Each AA includes multiple RAID stripes of a given RAID group. Each node of multiple nodes of a cluster representing a distributed storage system is provided with exclusive write access to one or more portions of the disaggregated storage space by assigning ownership a subset of the multiple AAs to a dynamically extensible file system (DEFS) of the node.

The present disclosure addresses the challenges in migrating data identified by a logical unit number (LUN) in a non-disruptive manner, from the distributed storage system shown below in FIG. 5 to the distributed storage system having a disaggregated storage architecture shown below in FIG. 6A. Since these distributed storage systems platforms are implemented based on fundamentally different architectures, pre-existing data migration techniques are not applicable. Hence, migrating data identified by LUNs from the distributed storage system shown below in FIG. 5 to the distributed storage system having a disaggregated storage architecture shown below in FIG. 6A may be problematic.

Embodiments of the present disclosure overcome these obstacles to provide for advantageous data migration. Additionally, embodiments non-disruptively migrate the LUNs from the distributed storage system shown below in FIG. 5 to the distributed storage system having a disaggregated storage architecture shown below in FIG. 6A, such that the clients are not required to rediscover the LUNs that are migrated and the applications of the distributed storage systems experience no down time. Another aspect that adds to the complexity of data migration processing is the object model of the distributed storage system having a disaggregated storage architecture shown below in FIG. 6A. Specifically, in the distributed storage system having a disaggregated storage architecture, there can be only one LUN per volume. Therefore, if there are multiple LUNs per volume in the distributed storage system shown below in FIG. 5, the multiple LUNs per volume need to be migrated into multiple volumes in the distributed storage system having a disaggregated storage architecture shown below in FIG. 6A.

Embodiments provide data migration techniques that utilize volume cloning, single file restore (SFR) functionality, and snapshot mirror active synchronization processing to non-disruptively migrate the LUNs from the distributed storage system shown below in FIG. 5 to the distributed storage system having a disaggregated storage architecture shown below in FIG. 6A.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 8 is a flow diagram illustrating operations for performing data migration using volume clones in accordance with an embodiment of the present disclosure.

DETAILED DESCRIPTION

Figure 1:
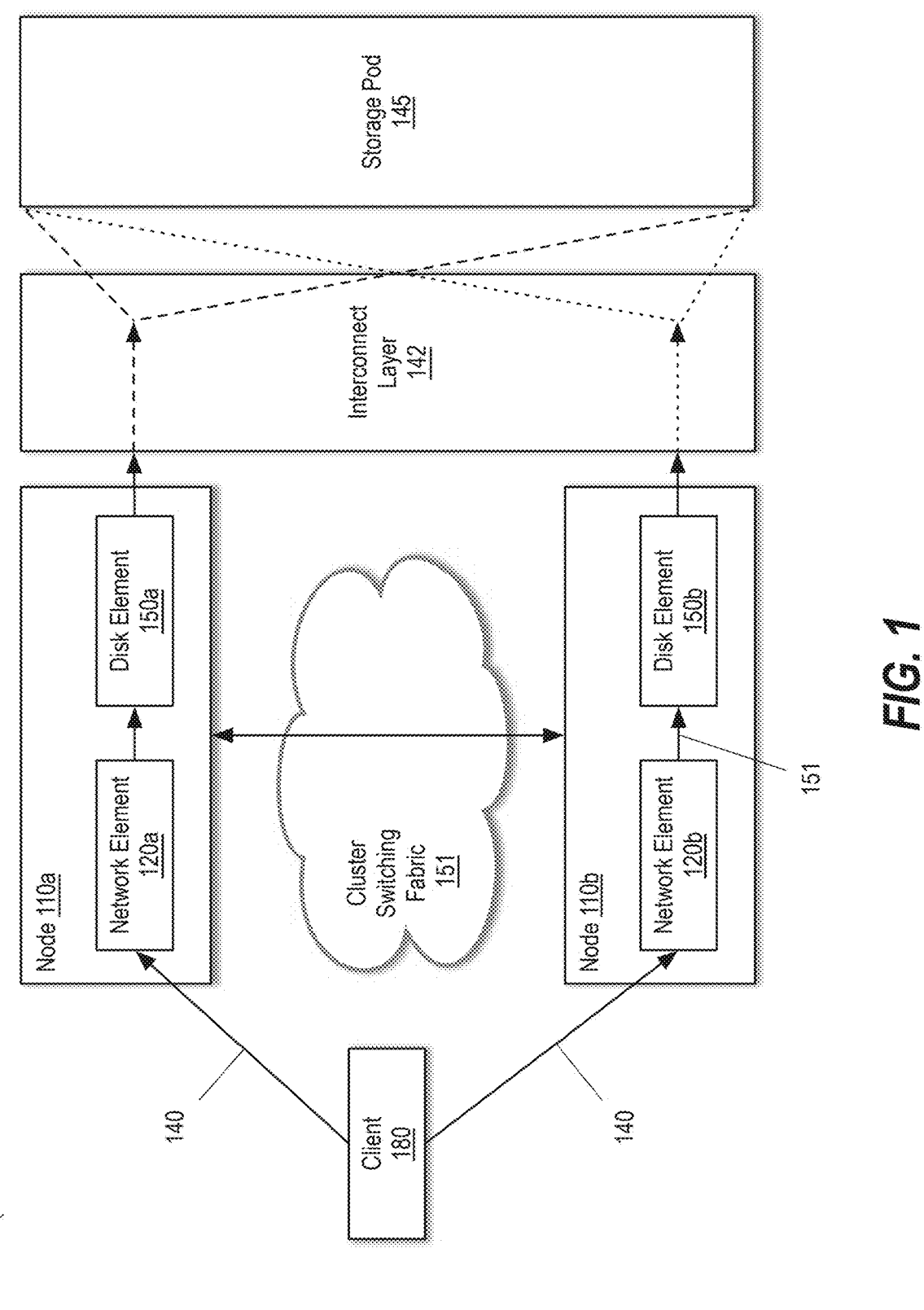
FIG. 1 is a block diagram illustrating a plurality of nodes interconnected as a cluster in accordance with an embodiment of the present disclosure.

Systems and methods are described for implementation and use of disaggregated storage of a storage pod by a distributed storage system. As compared to existing scale out storage solution architectures, various examples described herein facilitate various advantages, including, but not limited to, one or more of the following: 1) Simplified management; 2) No silos of storage space; 3) Independent file system operation on each node of a cluster; 4) Independent scaling of performance and capacity (e.g., the ability to independently add nodes and/or disks on demand); 5) Reduced internode (or "East-West") communications/traffic; 6) No additional redirection in the Input/Output (I/O) path; 7) No additional write amplification; 8) Integration with existing storage operating systems (e.g., the ONTAP data management software available from NetApp, Inc. of San Jose, CA); 9) Distributed disk operations; and 10) The ability to use all disks associated with a distributed storage system in a more uniform manner.

In various examples described herein, disk space may be used more fluidly across all the individual storage systems (e.g., nodes) of a distributed storage system (e.g., a cluster of nodes working together), thereby eliminating silos of storage; and processing resource (e.g., central processing unit (CPU)) load may be distributed across the cluster. The proposed architecture seeks to prevent a given disk from being tied to any single node of the cluster by introducing a new construct referred to herein as a "dynamically extensible file system," examples of which are described further below with reference to FIG. 6. In contrast to the entirety of a given storage device (e.g., a disk) being owned by a node-level aggregate and the aggregate file system being visible from only one node of a cluster as shown and described with reference to FIG. 5, the use of dynamically extensible file systems facilitates visibility by all nodes in the cluster to the entirety of a global physical volume block number (PVBN) space of the disks associated with a single "storage pod" (another new construct introduced herein) that may be shared by all of the nodes of the cluster with space from the global PVBN space being used on demand.

In one embodiment, each node of a cluster has access to read and write to all the disks in a storage pod associated with a cluster. Given all the nodes have access to the same disks, a RAID subsystem or layer can now assimilate the same RAID tree from the same set of disks and present the global PVBN space to the file system (e.g., a write anywhere file system, such as the write anywhere file layout (WAFL) file system available from NetApp, Inc. of San Jose, CA). Using the global PVBN space, each node of the cluster can create an independent file system that it needs. As those skilled in the art will appreciate, it would be dangerous for each node to allocate from the same global PVBN space independently and without limitation. As such, examples of the proposed architecture restrict each dynamically extensible file system to use (consume) space only from the blocks assigned to it. As such, when performing writes, each dynamically extensible file system stays in its own lane without the need for complex access control mechanisms, such as locks.

As described further below, in some examples, the association of blocks to a dynamically extensible file system may be in large chunks of one or more gigabytes (GB), which are referred to herein as "allocation areas" (AAs) that each include multiple RAID stripes. The use of large, multi-GB chunks, as the unit of space allocation/assignment to dynamically extensible file systems facilitate case of management (e.g., by way of reducing the frequency of ownership transfers among dynamically extensible file systems) of these AAs. The assignment of AAs to individual dynamically extensible file systems, which in turn are owned by nodes, additionally helps each node do its write allocation independently since, by definition an entire RAID stripe is owned by a single dynamically extensible file system. In some embodiments, dynamically extensible file systems also minimize or at least significantly reduce the need for inter-node communications. For example, dynamically extensible file systems can limit their coordination across nodes to situations in which space balancing is to be performed (e.g., responsive to a node running low on free storage space relative to the other nodes), which is not a frequent operation. Responsive to a space balancing trigger event, a given dynamically extensible file system (or the node owning given dynamically extensible file system on behalf of the given dynamically extensible file system) may request space be reassigned to it from one or more other dynamically extensible file systems. The combination of visibility into the entire global PVBN space and the use of dynamically extensible file systems and their association with a given portion of the disaggregated storage of a storage pod to which a given dynamically extensible file system has exclusive write access enables each node to run independently most of the time.

In the following description, numerous specific details are set forth to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyper-scaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein, a "storage system" or "storage appliance" generally refers to a type of computing appliance or node, in virtual or physical form, that provides data to, or manages data for, other computing devices or clients (e.g., applications). The storage system may be part of a cluster of multiple nodes representing a distributed storage system. In various examples described herein, a storage system may be run (e.g., on a VM or as a containerized instance, as the case may be) within a public cloud provider.

As used herein, the term "storage operating system" generally refers to computer-executable code operable on a computer to perform a storage function that manages data access and may, in the case of a storage system (e.g., a node), implement data access semantics of a general-purpose operating system. The storage operating system can also be implemented as a microkernel, an application program operating over a general-purpose operating system, such as UNIX or Windows NT, or as a general-purpose operating system with configurable functionality, which is configured for storage applications as described herein. In some embodiments, a light-weight data adaptor may be deployed on one or more server or compute nodes added to a cluster to allow compute-intensive data services to be performed without adversely impacting performance of storage operations being performed by other nodes of the cluster. The light-weight data adaptor may be created based on a storage operating system but, since the server node will not participate in handling storage operations on behalf of clients, the light-weight data adaptor may exclude various subsystems/modules that are used solely for serving storage requests and that are unnecessary for performance of data services. In this manner, compute intensive data services may be handled within the cluster by one of more dedicated compute nodes.

As used herein, a "cloud volume" generally refers to persistent storage that is accessible to a virtual storage system by virtue of the persistent storage being associated with a compute instance in which the virtual storage system is running. A cloud volume may represent a hard-disk drive (HDD) or a solid-state drive (SSD) from a pool of storage devices within a cloud environment that is connected to the compute instance through Ethernet or Fibre Channel (FC) switches as is the case for network-attached storage (NAS) or a storage area network (SAN). Non-limiting examples of cloud volumes include various types of SSD volumes (e.g., Amazon Web Services (AWS) Elastic Block Store (EBS) gp2, gp3, io1, and io2 volumes for EC2 instances) and various types of HDD volumes (e.g., AWS EBS st1 and sc1 volumes for EC2 instances).

As used herein a "consistency point" or "CP" generally refers to the act of writing data to disk and updating active file system pointers. In various examples, when a file system of a storage system receives a write request, it commits the data to permanent storage before the request is confirmed to the writer. Otherwise, if the storage system were to experience a failure with data only in volatile memory, that data would be lost, and underlying file structures could become corrupted. Physical storage appliances commonly use battery-backed high-speed non-volatile random-access memory (NVRAM) as a journaling storage media to journal writes and accelerate write performance while providing permanence, because writing to memory is much faster than writing to storage (e.g., disk). Storage systems may also implement a buffer cache in the form of an in-memory cache to cache data that is read from data storage media (e.g., local mass storage devices or a storage array associated with the storage system) as well as data modified by write requests. In this manner, in the event a subsequent access relates to data residing within the buffer cache, the data can be served from local, high performance, low latency storage, thereby improving overall performance of the storage system. Virtual storage appliances may use NV storage backed by cloud volumes in place of NVRAM for journaling storage and for the buffer cache. Regardless of whether NVRAM or NV storage is utilized, the modified data may be periodically (e.g., every few seconds) flushed to the data storage media. As the buffer cache may be limited in size, an additional cache level may be provided by a victim cache, typically implemented within a slower memory or storage device than utilized by the buffer cache, that stores data evicted from the buffer cache. The event of saving the modified data to the mass storage devices may be referred to as a CP. At a CP, the file system may save any data that was modified by write requests to persistent data storage media.

As will be appreciated, when using a buffer cache, there is a small risk of a system failure occurring between CPs, causing the loss of data modified after the last CP. Consequently, the storage system may maintain an operation log or journal of certain storage operations within the journaling storage media that have been performed since the last CP. This log may include a separate journal entry (e.g., including an operation header) for each storage request received from a client that results in a modification to the file system or data. Such entries for a given file may include, for example, "Create File," "Write File Data," and the like. Depending upon the operating mode or configuration of the storage system, each journal entry may also include the data to be written according to the corresponding request. The journal may be used in the event of a failure to recover data that would otherwise be lost. For example, in the event of a failure, it may be possible to replay the journal to reconstruct the current state of stored data just prior to the failure. As described further below, in various examples there may be one or more predefined or configurable triggers (CP triggers). Responsive to a given CP trigger (or at a CP), the file system may save any data that was modified by write requests to persistent data storage media.

As used herein, a "RAID stripe" generally refers to a set of blocks spread across multiple storage devices (e.g., disks of a disk array, disks of a disk shelf, or cloud volumes) to form a parity group (or RAID group).

As used herein, an "allocation area" or "AA" generally refers to a group of RAID stripes. In various examples described herein a single storage pod may be shared by a distributed storage system by assigning ownership of AAs to respective dynamically extensible file systems of a storage system.

As used herein, a "free allocation area" or "free AA" generally refers to an AA in which no PVBNs of the AA are marked as used, for example, by any active maps of a given dynamically extensible file system.

As used herein, a "partial allocation area" or "partial AA" generally refers to an AA in which one or more PVBNs of the AA are marked as in use (containing valid data), for example, by an active map of a given dynamically extensible file system. As discussed further below, in connection with space balancing, while it is preferable to perform AA ownership changes of free AAs, in various examples, space balancing may involve one dynamically extensible file system donating one or more partial AAs to another dynamically extensible file system. In such cases, the additional cost of copying portions of one or more associated data structures (e.g., bit maps, such as an active map, a refcount map, a summary map, an AA information map, and a space map) relating to storage space information may be incurred. No such additional cost is incurred when moving or changing ownership of free AAs. These associated data structures may, among other things, track which PVBNs are in use, track PVBN counts per AA (e.g., total used blocks and shared references to blocks) and other flags.

As used herein, a "storage pod" generally refers to a group of disks containing multiple RAID groups that are accessible from all storage systems (nodes) of a distributed storage system (cluster).

As used herein, a "data pod" generally refers to a set of storage systems (nodes) that share the same storage pod. In some examples, a data pod refers to a single cluster of nodes representing a distributed storage system. In other examples, there can be multiple data pods in a cluster. Data pods may be used to limit the fault domain and there can be multiple HA pairs of nodes within a data pod.

As used herein, an "active map" is a data structure that contains information indicative of which PVBNs of a distributed file system are in use. In one embodiment, the active map is represented in the form of a sparce bit map in which each PVBN of a global PVBN space of a storage pod has a corresponding Boolean value (or truth value) represented as a single bit, for example, in which the true (1) indicates the corresponding PVBN is in use and false (0) indicates the corresponding PVBN is not in use.

As used herein, a "dynamically extensible file system" or a "DEFS" generally refers to a file system of a data pod or a cluster that has visibility into the entire global PVBN space of a storage pod and hosts multiple volumes. A DEFS may be thought of as a data container or a storage container (which may be referred to as a storage segment container) to which AAs are assigned, thereby resulting in a more flexible and enhanced version of a node-level aggregate. As described further herein (for example, in connection with automatic space balancing), the storage space associated with one or more AAs of a given DEFS may be dynamically transferred or moved on demand to any other DEFS in the cluster by changing the ownership of the one or more AAs and moving associated AA tracking data structures as appropriate. This provides the unique ability to independently scale each DEFS of a cluster. For example, DEFSs can shrink or grow dynamically over time to meet their respective storage needs and silos of storage space are avoided.

In one embodiment, a distributed file system comprises multiple instances of the WAFL Copy-on-Write file system running on respective storage systems (nodes) of a distributed storage system (cluster) that represents the data pod. In various examples described herein, a given storage system (node) of a distributed storage system (cluster) may own one or more DEFSs including, for example, a log DEFS for hosting an operation log or journal of certain storage operations that have been performed by the node since the last CP and a data DEFS for hosting customer volumes or logical unit numbers (LUNs). As described further below, the partitioning/division of a storage pod into AAs (creation of a disaggregated storage space) and the distribution of ownership of AAs among DEFSs of multiple nodes of a cluster may facilitate implementation of a distributed storage system having a disaggregated storage architecture.

In various examples described herein, each storage system may have its own portion of disaggregated storage to which it has the exclusive ability to perform write access, thereby simplifying storage management by, among other-ings, not requiring implementation of access control mechanisms, for example, in the form of locks. At the same time, each storage system also has visibility into the entirety of a global PVBN space, thereby allowing read access by a given storage system to any portion of the disaggregated storage regardless of which node of the cluster is the current owner of the underlying allocation areas. Based disclosure provided herein, those skilled in the art will understand there are at least two types of disaggregation represented/achieved within various examples, including (i) the disaggregation of storage space provided by a storage pod by dividing or partitioning the storage space into AAs the ownership of which can be fluidly changed from one DEFS to another on demand and (ii) the disaggregation of the storage architecture into independent components, including the decoupling of processing resources and storage resources, thereby allowing them to be independently scaled. In one embodiment, the former (which may also be referred to as modular storage, partitioned storage, adaptable storage, or fluid storage) facilitates the latter.

As used herein, an "allocation area map" or "AA map" generally refers to a per dynamically extensible file system data structure or file (e.g., a metafile) that contains information at an AA-level of granularity indicative of which AAs are assigned to or "owned" by a given dynamically extensible file system.

A "node-level aggregate" generally refers to a file system of a single storage system (node) that holds multiple volumes created over one or more RAID groups, in which the node owns the entire PVBN space of the collection of disks of the one or more RAID groups. Node-level aggregates are only accessible from a single storage system (node) of a distributed storage system (cluster) at a time.

As used herein, an "inode" generally refers to a file data structure maintained by a file system that stores metadata for data containers (e.g., directories, subdirectories, disk files, etc.). An inode may include, among other things, location, file size, permissions needed to access a given file with which it is associated as well as creation, read, and write timestamps, and one or more flags.

As used herein, a "storage volume" or "volume" generally refers to a container in which applications, databases, and file systems store data. A volume is a logical component created for the host to access storage on a storage array. A volume may be created from the capacity available in storage pod, a pool, or a volume group. A volume has a defined capacity. Although a volume might consist of more than one drive, a volume appears as one logical component to the host. Non-limiting examples of a volume include a flexible volume and a flexgroup volume.

As used herein, a "flexible volume" generally refers to a type of storage volume that may be efficiently distributed across multiple storage devices. A flexible volume may be capable of being resized to meet changing business or application requirements. In some embodiments, a storage system may provide one or more aggregates and one or more storage volumes distributed across a plurality of nodes interconnected as a cluster. Each of the storage volumes may be configured to store data such as files and logical units. As such, in some embodiments, a flexible volume may be comprised within a storage aggregate and further comprises at least one storage device. The storage aggregate may be abstracted over a RAID plex where each plex comprises a RAID group. Moreover, each RAID group may comprise a plurality of storage disks. As such, a flexible volume may comprise data storage spread over multiple storage disks or devices. A flexible volume may be loosely coupled to its containing aggregate. A flexible volume can share its containing aggregate with other flexible volumes. Thus, a single aggregate can be the shared source of all the storage used by all the flexible volumes contained by that aggregate. A non-limiting example of a flexible volume is a NetApp ONTAP Flex Vol volume.

As used herein, a "flexgroup volume" generally refers to a single namespace that is made up of multiple constituent/member volumes. A non-limiting example of a flexgroup volume is a NetApp ONTAP FlexGroup volume that can be managed by storage administrators, and which acts like a NetApp Flex Vol volume. In the context of a flexgroup volume, "constituent volume" and "member volume" are interchangeable terms that refer to the underlying volumes (e.g., flexible volumes) that make up the flexgroup volume. Example Distributed Storage System Cluster FIG. 1 is a block diagram illustrating a plurality of nodes 110*a-b* interconnected as a cluster 100 in accordance with an embodiment of the present disclosure. In the context of the present example, the nodes 110*a-b* comprise various functional components that cooperate to provide a distributed storage system architecture of cluster 100. To that end, in the context of the present example, each node is generally organized as a network element (e.g., network element 120*a* or 120*b*) and a disk element (e.g., disk element 150*a* or 150*b*). The network element includes functionality that enables the node to connect to clients (e.g., client 180) over a computer network 140, while each disk element 350 connects to one or more storage devices, such as disks, of one or more disk arrays (not shown) or of one or more storage shelves (not shown), represented as a single shared storage pod 145.

In the context of the present example, the nodes 110*a-b* are interconnected by a cluster switching fabric 151 which, in an example, may be embodied as a Gigabit Ethernet switch. It should be noted that while there is shown an equal number of network and disk elements in the illustrative cluster 100, there may be differing numbers of network and/or disk elements. For example, there may be a plurality of network elements and/or disk elements interconnected in a cluster configuration 100 that does not reflect a one-to-one correspondence between the network and disk elements. As such, the description of a node comprising one network element and one disk element should be taken as illustrative only.

Clients may be general-purpose computers configured to interact with the node in accordance with a client/server model of information delivery. That is, each client (e.g., client 180) may request the services of the node, and the node may return the results of the services requested by the client, by exchanging packets over network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. In various examples described herein, an administrative user (not shown) of the client may make use of a user interface (UI) presented by the cluster or a command line interface (CLI) of the cluster to, among other things, establish a data protection relationship between a source volume and a destination volume (e.g., a mirroring relationship specifying one or more policies associated with creation, retention, and transfer of snapshots), defining snapshot and/or backup policies, and association of snapshot policies with snapshots.

Disk elements 150*a* and 150*b* are illustratively connected to disks (not shown) within that may be organized into disk arrays within the storage pod 145. Alternatively, storage devices other than disks may be utilized, e.g., flash memory, optical storage, solid state devices, etc. As such, the description of disks should be taken as exemplary only.

In general, various embodiments envision a cluster (e.g., cluster 100) in which every node (e.g., nodes 110*a-b*) can essentially talk to every storage device (e.g., disk) in the storage pod 145. This is in contrast to the distributed storage system architecture described with reference to FIG. 5. In examples described herein, all nodes (e.g., nodes 110*a-b*) of the cluster have visibility and read access to an entirety of a global PVBN space of the storage pod 145, for example, via an interconnect layer 142. As described further below, according to one embodiment, the storage within the storage pod 145 is grouped into distinct allocation areas (AAs) than can be assigned to a given dynamically extensible file system (DEFS) of a node to facilitate implementation disaggregated storage. In examples described herein, the AAs assigned to a given DEFS may be said to "own" the assigned AAs and the node owning the given DEFS has the exclusive write access to the associated PVBNs and the exclusive ability to perform write allocation from such blocks. In one embodiment, each node has its own view of a portion of the disaggregated storage represented by the assignment of, for example, via respective allocation area (AA) maps and active maps. This granular assignment of AAs and ability to fluidly change ownership of AAs as needed facilitates the elimination of per-node storage silos and provides higher and more predictable performance, which further translate into improved storage utilization and improvements in cost effectiveness of the storage solution.

Depending on the implementation, the interconnect layer 142 may be represented by an intermediate switching topology or some other interconnectivity layer or disk switching layer between the disks in the storage pod 145 and the nodes. Non-limiting examples of the interconnect layer 150 include one or more fiber channel switches or one or more non-volatile memory express (NVMe) fabric switches. Additional details regarding the storage pod 145, DEFSs, AA maps, active maps, and the use, ownership, and sharing (transferring of ownership) of AAs are described further below.

Example Storage System Node

Figure 2:
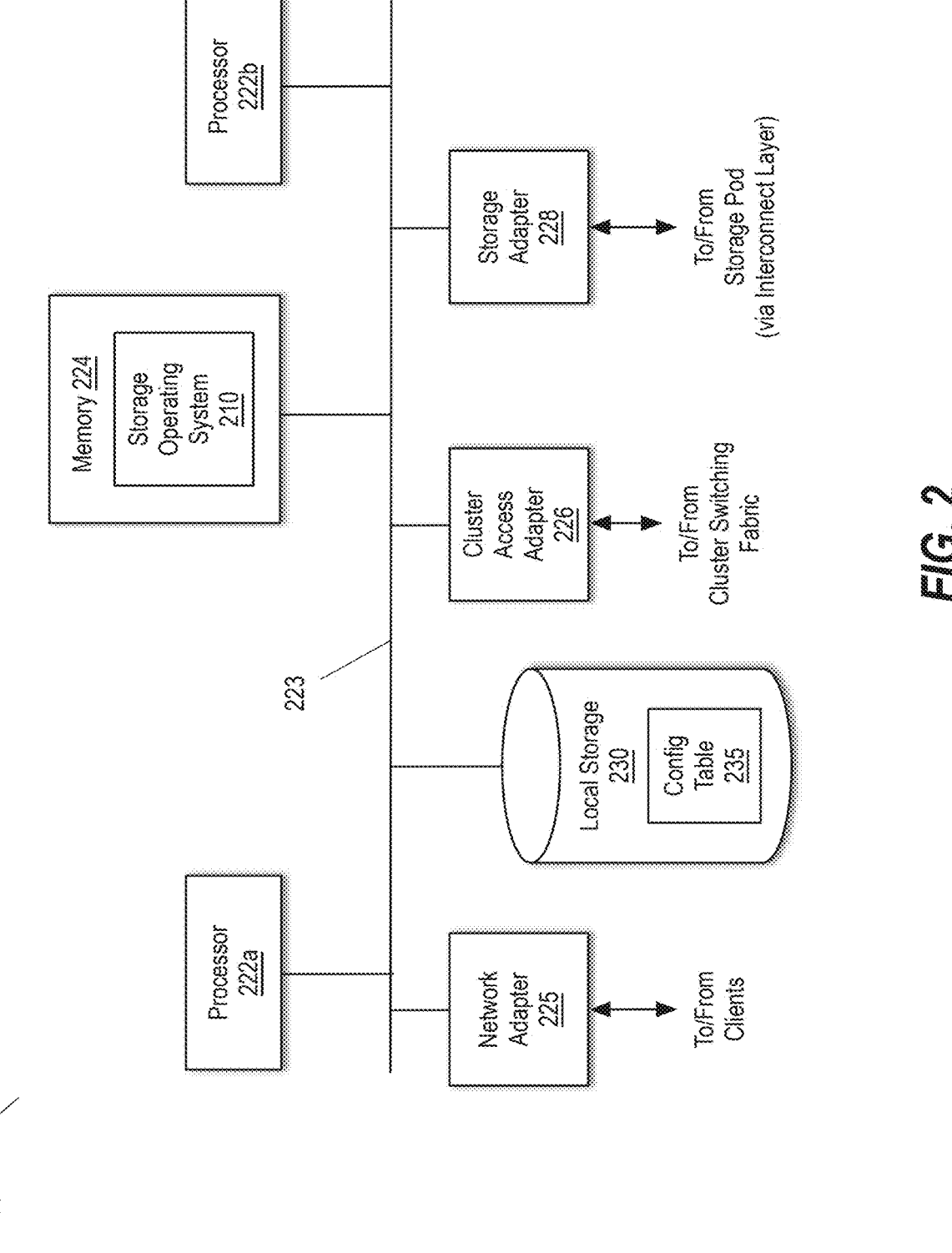
FIG. 2 is a block diagram illustrating a node in accordance with an embodiment of the present disclosure.

FIG. 2 is a block diagram of a node 200 that is illustratively embodied as a storage system comprising a plurality of processors (e.g., processors 222a-b), a memory 224, a network adapter 225, a cluster access adapter 226, a storage adapter 228 and local storage 230 interconnected by a system bus 223. Node 200 may be analogous to nodes 110a and 110b of FIG. 1. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster (e.g., cluster 100). Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster.

In the context of the present example, each node 200 is illustratively embodied as a dual processor storage system executing a storage operating system 210 that implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor (e.g., processor 222a) may execute the functions of the network element (e.g., network element 120a or 120b) on the node, while the other processor (e.g., processor 222b) may execute the functions of the disk element (e.g., disk element 150a or 150b).

Memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 210, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients (e.g., client 180) over point-to-point links, wide area networks, virtual private networks implemented over a public network (Internet) or a shared local area network. The network adapter 225 thus may comprise the mechanical, electrical and signaling circuitry needed to connect the node to a network (e.g., computer network 140). Illustratively, the network may be embodied as an Ethernet network or a Fibre Channel (FC) network. Each client (e.g., client 180) may communicate with the node over network by exchanging discrete frames or packets of data according to pre-defined protocols, such as TCP/IP.

The storage adapter 228 cooperates with the storage operating system 210 executing on the node 200 to access information requested by the clients. The information may be stored on any type of attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks (e.g., associated with storage pod 145). The storage adapter comprises a plurality of ports having input/output (I/O) interface circuitry that couples to the disks over an I/O interconnect arrangement, such as a conventional high-performance, FC link topology.

Storage of information on each disk array may be implemented as one or more storage "volumes" that comprise a collection of physical storage disks or cloud volumes cooperating to define an overall logical arrangement of volume block number (VBN) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

While in the context of the present example, the node may be a physical host, it is to be appreciated the node may be implemented in virtual form. For example, a storage system may be run (e.g., on a VM or as a containerized instance, as the case may be) within a public cloud provider. As such, a cluster representing a distributed storage system may be comprised of multiple physical nodes (e.g., node 200) or multiple virtual nodes (virtual storage systems).

Example Storage Operating System

To facilitate access to the disks (e.g., disks within one or more disk arrays of a storage pod, such as storage pod 145 of FIG. 1), a storage operating system (e.g., storage operating system 300, which may be analogous to storage operating system 210) may implement a write-anywhere file system that cooperates with one or more virtualization modules to "virtualize" the storage space provided by disks. The file system logically organizes the information as a hierarchical structure of named directories and files on the disks. Each "on-disk" file may be implemented as a set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

Illustratively, the storage operating system may be the Data ONTAP operating system available from NetApp, Inc., San Jose, Calif. that implements the WAFL file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this disclosure.

Figure 3:
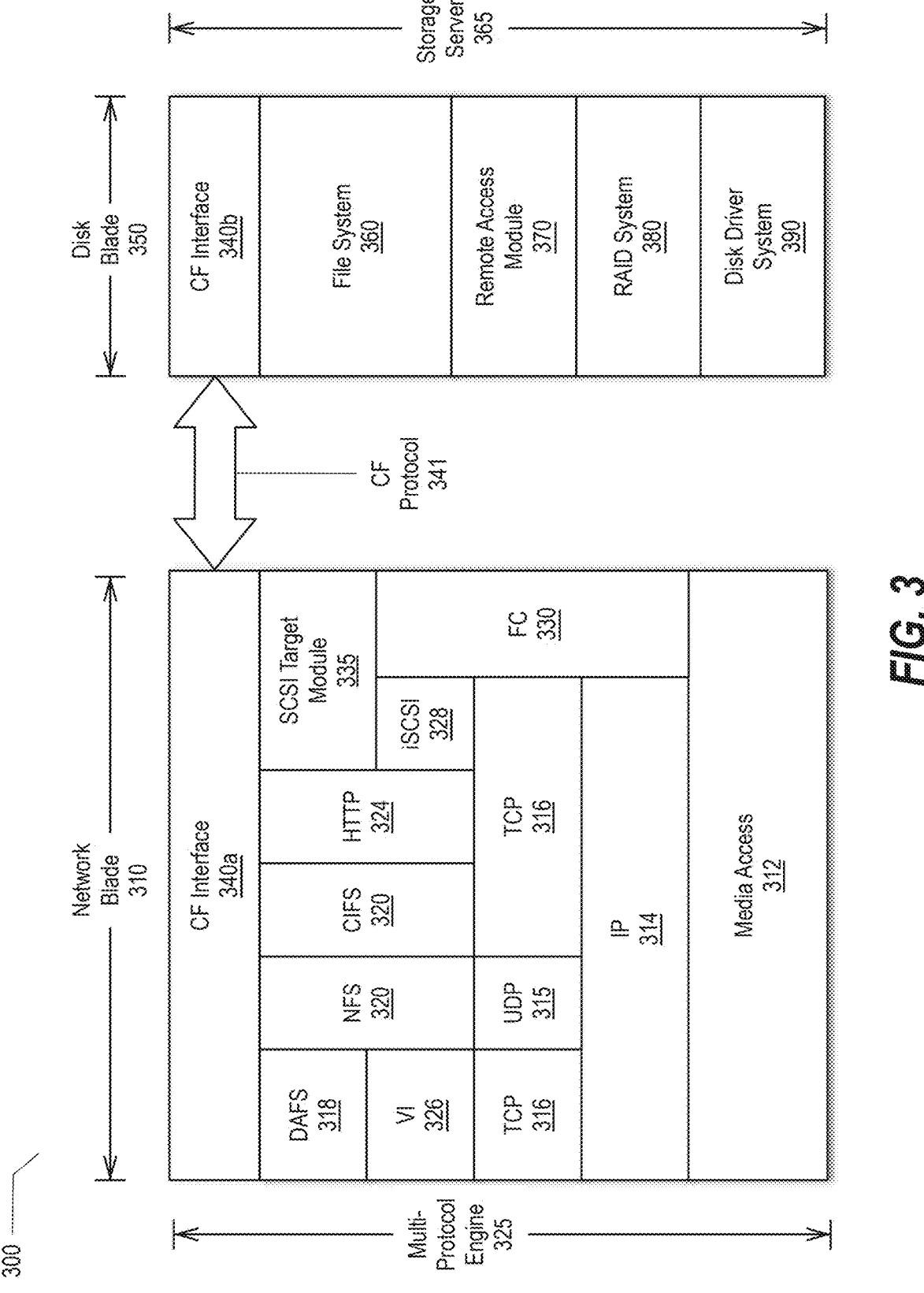
FIG. 3 is a block diagram illustrating a storage operating system in accordance with an embodiment of the present disclosure.

FIG. 3 is a block diagram illustrating a storage operating system 300 in accordance with an embodiment of the present disclosure. In the context of the present example, the storage operating system 300 is shown including a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as ROMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of LUNs to either iSCSI or FCP or, alternatively, to both iSCSI and FCP when accessing the blocks on the node (e.g., node 200).

In addition, the storage operating system may include a series of software layers organized to form a storage server 365 that provides data paths for accessing information stored on the disks (e.g., disks 130) of the node. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 may implement a virtualization system of the storage operating system 300 through the interaction with one or more virtualization modules illustratively embodied as, for example, a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (LUN) space and the file system space, where LUNs are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client (e.g., client 180) is forwarded as a packet over a computer network (e.g., computer network 140) and onto a node (e.g., node 200) where it is received at a network adapter (e.g., network adaptor 225). A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical VBN. The file system then passes a message structure including the logical VBN to the RAID system 380; the logical VBN is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Alternatively, the processing elements of adapters 225, 228 may be configured to offload some or all the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node (e.g., node 200), implement data access semantics of a general-purpose operating system. The storage operating system can also be implemented as a microkernel, an application program operating over a general-purpose operating system, such as UNIX or Windows NT, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Example Cluster Fabric (CF) Protocol

Illustratively, the storage server 365 is embodied as disk element (or disk blade 350, which may be analogous to disk element 150a or 150b) of the storage operating system 300 to service one or more volumes of array 160. In addition, the multi-protocol engine 325 is embodied as network element (or network blade 310, which may be analogous to network element 120a or 120b) to (i) perform protocol termination with respect to a client issuing incoming data access request packets over the network (e.g., network 140), as well as (ii) redirect those data access requests to any storage server 365 of the cluster (e.g., cluster 100). Moreover, the network element 310 and disk element 350 cooperate to provide a highly scalable, distributed storage system architecture of the cluster. To that end, each module may include a cluster fabric (CF) interface module (e.g., CF interface 340a and 340b) adapted to implement intra-cluster communication among the nodes (e.g., node 110a and 110b). In the context of a distributed storage architecture as described below with reference to FIG. 5 in which node-level aggregates are employed, the CF protocol facilitates, among other things, internode communications relating to data access requests. It is to be appreciated such internode communications relating to data access requests are not needed in the context of a distributed storage architecture as described below with reference to FIG. 6 in which each node of a cluster has visibility and access to the entirety of a global PVBN space of a storage pod (via their respective DEFSs). However, in various embodiments, some limited amount of internode communications, for example, relating to storage space reporting (or simply space reporting) and storage space requests (e.g., requests for donations of AAs) continue to be useful. As described further below, such internode communications may make use of the CF protocol or other forms of internode communications, including message passing via on-wire communications and/or the use of one or more persistent message queues (or on-disk message queues), which may make use of the fact that all nodes can read from all disks of a storage pod. For example, a persistent message queue may be maintained at the node and/or DEFS-level of granularity in which each node and/or DEFS has a message queue to which others can post messages destined for the node or DEFS (as the case may be). In one embodiment, each DEFS has an associated inbound queue on which it receives messages sent by another DEFS in the cluster and an associated outbound queue on which it posts messages intended for delivery to another DEFS in the cluster The protocol layers, e.g., the NFS/CIFS layers and the iSCSI/IFC layers, of the network element 310 may function as protocol servers that translate file-based and block-based data access requests from clients into CF protocol messages used for communication with the disk element 350. That is, the network element servers may convert the incoming data access requests into file system primitive operations (commands) that are embedded within CF messages by the CF interface module 340 for transmission to the disk elements of the cluster.

Further, in an illustrative aspect of the disclosure, the network element and disk element are implemented as separately scheduled processes of storage operating system 300; however, in an alternate aspect, the modules may be implemented as pieces of code within a single operating system process. Communication between a network element and disk element may thus illustratively be implemented through the use of message passing between the modules although, in the case of remote communication between a network element and disk element of different nodes, such message passing occurs over a cluster switching fabric (e.g., cluster switching fabric 151). A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands among the nodes or modules of cluster. Communication may be illustratively implemented by the disk element exposing the CF API to which a network element (or another disk element) issues calls. To that end, the CF interface module 340 may be organized as a CF encoder and CF decoder. The CF encoder of, e.g., CF interface 340*a* on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340*b* on disk element 350 de-encapsulates the CF message and processes the file system command.

Illustratively, the remote access module 370 may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that may convey file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., a network element 310) to a destination (e.g., a disk element 350). The RC layer implements a reliable transport protocol that is adapted to process such envelopes in accordance with a connectionless protocol, such as UDP.

Example File System Layout

In one embodiment, a data container is represented in the write-anywhere file system as an inode data structure adapted for storage on the disks of a storage pod (e.g., storage pod 145). In such an embodiment, an inode includes a meta-data section and a data section. The information stored in the meta-data section of each inode describes the data container (e.g., a file, a snapshot, etc.) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical VBN to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 224 pointers, each of which references a 4 KB data block on disk. For file system data having a size greater than 64 MB, each pointer in the data section of the inode (e.g., a third level L3 inode) references a double-indirect block (e.g., a second level L2 block) that contains 224 pointers, each referencing an indirect (e.g., a first level L1) block. The indirect block, in turn, contains 224 pointers, each of which references a 4 kB data block on disk. When accessing a file, each block of the file may be loaded from disk into memory (e.g., memory 224). In other embodiments, higher levels are also possible that may be used to handle larger data container sizes.

When an on-disk inode (or block) is loaded from disk into memory, its corresponding in-core structure embeds the on-disk structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree that provides an internal representation of blocks for a file loaded into memory and maintained by the write-anywhere file system 360. A root (top-level) buffer, such as the data section embedded in an inode, references indirect (e.g., level 1) blocks. In other embodiments, there may be additional levels of indirect blocks (e.g., level 2, level 3) depending upon the size of the file. The indirect blocks (e.g., and inode) include pointers that ultimately reference data blocks used to store the actual data of the file. That is, the data of file are contained in data blocks and the locations of these blocks are stored in the indirect blocks of the file. Each level 1 indirect block may include pointers to as many as 224 data blocks. According to the "write anywhere" nature of the file system, these blocks may be located anywhere on the disks.

In one embodiment, a file system layout is provided that apportions an underlying physical volume into one or more virtual volumes (or flexible volumes) of a storage system, such as node 200. In such an embodiment, the underlying physical volume is an aggregate comprising one or more groups of disks, such as RAID groups, of the node. The aggregate has its own physical volume block number (PVBN) space and maintains meta-data, such as block allocation structures, within that PVBN space. Each flexible volume has its own virtual volume block number (VVBN) space and maintains meta-data, such as block allocation structures, within that VVBN space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In a further embodiment, PVBNs are used as block pointers within buffer trees of files stored in a flexible volume. This "hybrid" flexible volume example involves the insertion of only the PVBN in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following PVBNs (instead of VVBNs) to find appropriate locations of blocks; in this context, the read path (and corresponding read performance) of a flexible volume is substantially similar to that of a physical volume. Translation from PVBN-to-disk,dbn occurs at the file system/RAID system boundary of the storage operating system 300.

In a dual VBN hybrid flexible volume example, both a PVBN and its corresponding VVBN are inserted in the parent indirect blocks in the buffer tree of a file. That is, the PVBN and VVBN are stored as a pair for each block pointer in most buffer tree structures that have pointers to other blocks, e.g., level 1 (L1) indirect blocks, inode file level 0 (L0) blocks.

A root (top-level) buffer, such as the data section embedded in an inode, references indirect (e.g., level 1) blocks. Note that there may be additional levels of indirect blocks (e.g., level 2, level 3) depending upon the size of the file. The indirect blocks (and inode) include PVBN/VVBN pointer pair structures that ultimately reference data blocks used to store the actual data of the file. The PVBNs reference locations on disks of the aggregate, whereas the VVBNs reference locations within files of the flexible volume. The use of PVBNs as block pointers in the indirect blocks provides efficiencies in the read paths, while the use of VVBN block pointers provides efficient access to required meta-data. That is, when freeing a block of a file, the parent indirect block in the file contains readily available VVBN block pointers, which avoids the latency associated with accessing an owner map to perform PVBN-to-VVBN translations; yet, on the read path, the PVBN is available.

Example Hierarchical Inode Tree

Figure 4:
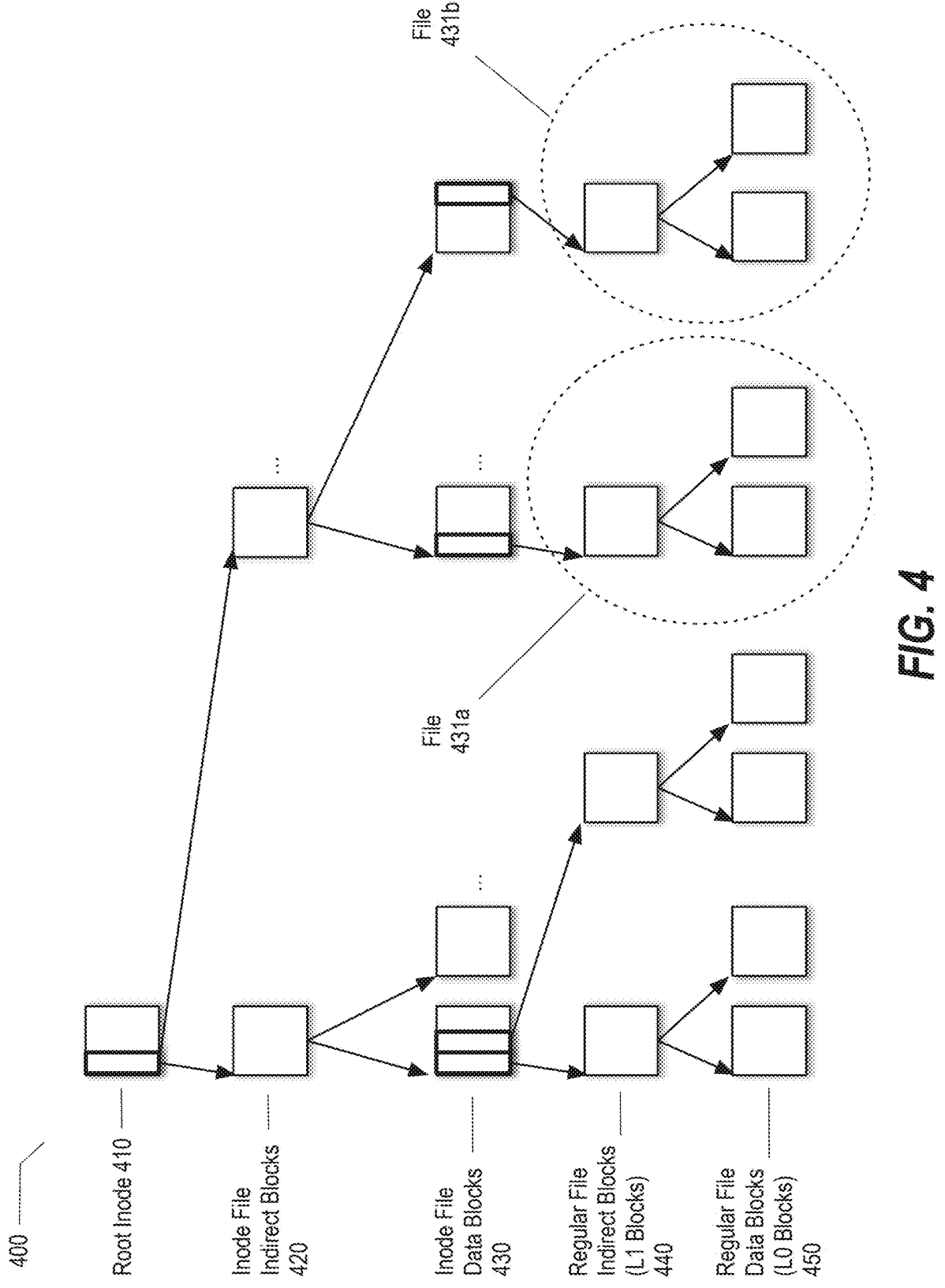
FIG. 4 is a block diagram illustrating a tree of blocks representing an example of a file system layout in accordance with an embodiment of the present disclosure.

FIG. 4 is a block diagram illustrating a tree of blocks 400 representing a simplified view of an example file system layout in accordance with an embodiment of the present disclosure. In one embodiment, the data storage system nodes (e.g., data storage systems 110*a-b*) make use of a write anywhere file system (e.g., the WAFL file system). The write anywhere file system may represent a UNIX compatible file system that is optimized for network file access. In the context of the present example, the write anywhere file system is a block-based file system that represents file system data (e.g., a block map file and an inode map file), meta-data files, and data containers (e.g., volumes, subdirectories, and regular files) in a tree of blocks (e.g., tree of blocks 400). Keeping meta-data in files allows the file system to write meta-data blocks anywhere on disk and makes it easier to increase the size of the file system on the fly.

In this simplified example, the tree of blocks 400 has a root inode 410, which describes an inode map file (not shown), made up of inode file indirect blocks 420 and inode file data blocks 430. In this example, the file system uses inodes (e.g., inode file data blocks 430) to describe data containers representing files (e.g., file 431*a* and file 431*b*). In one embodiment, each inode contains 16 block pointers to indicate which blocks (e.g., of 4 KB) belong to a given data container (e.g., a file). Inodes for data containers smaller than 64 KB may use the 156 block pointers to point to file data blocks or simply data blocks (e.g., regular file data blocks, which may also be referred to herein as L0 blocks 450). Inodes for files smaller than 64 MB may point to indirect blocks (e.g., regular file indirect blocks, which may also be referred to herein as L1 blocks 440), which point to actual file data. Inodes for larger files or data containers may point to doubly indirect blocks. For very small files, data may be stored in the inode itself in place of the block pointers.

As will be appreciated by those skilled in the art given the above-described file system layout, yet another advantage of DEFSs is their ability to facilitate storage space balancing and/or load balancing. This comes from the fact that the entire global PVBN space of a storage pod is visible to all DEFSs of the cluster and therefore any given DEFS can get access to an entire file by copying the top-most PVBN from the inode on another tree.

Example of a Distributed Storage System Architecture with Storage Silos

Figure 5:
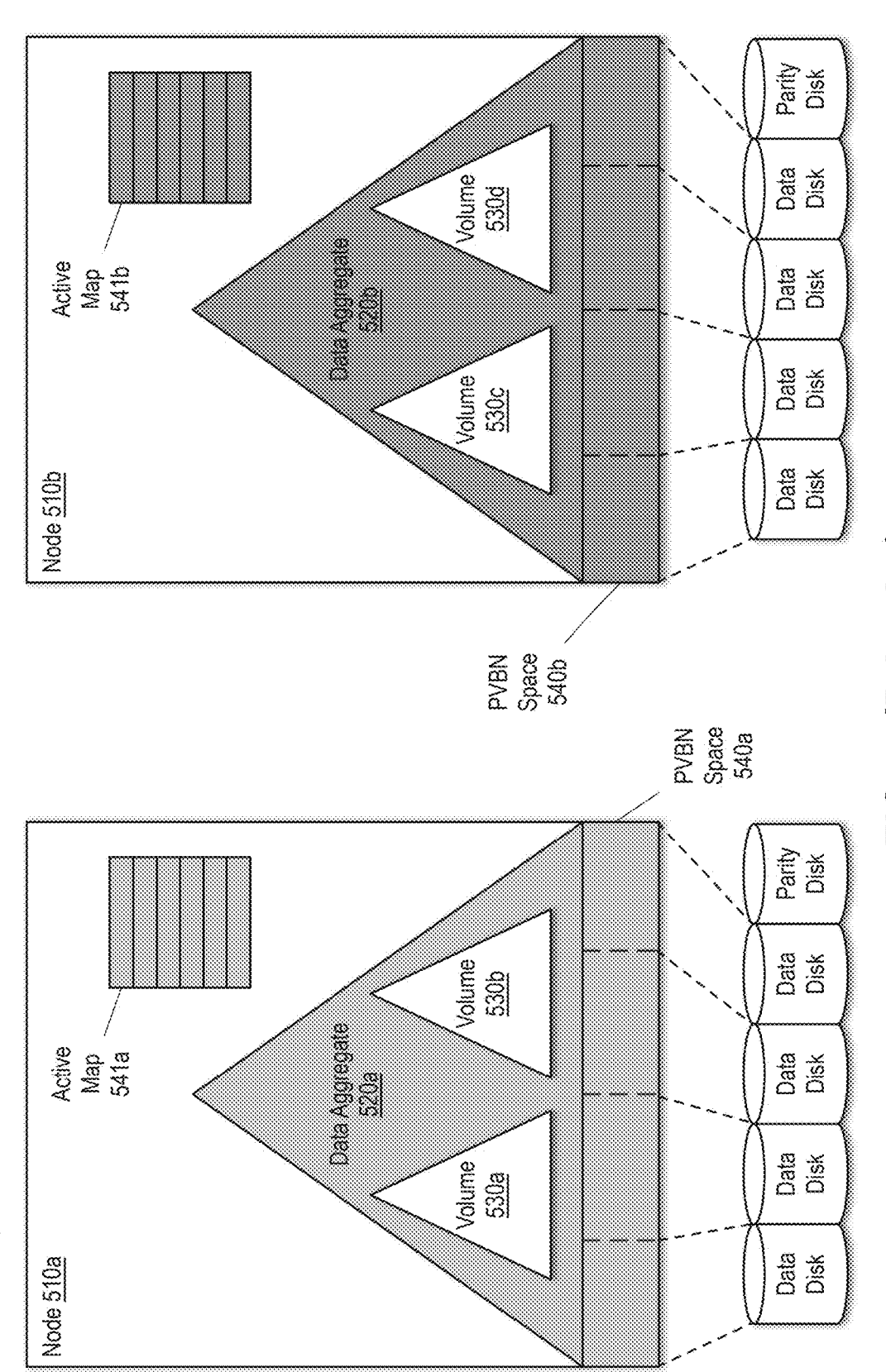
FIG. 5 is a block diagram illustrating a distributed storage system architecture in which the entirety of a given disk and a given RAID group are owned by an aggregate and the aggregate file system is only visible from one node, thereby resulting in silos of storage space.

FIG. 5 is a block diagram illustrating a distributed storage system architecture 500 in which the entirety of a given disk and a given RAID group are owned by an aggregate and the aggregate file system is only visible from one node, thereby resulting in silos of storage space. In the context of FIG. 5, node 510*a* and node 510*b* may represent a two-node cluster in which the nodes are high-availability (HA) partners. For example, one node may represent a primary node and the other may represent a secondary node in which pairwise disk connectively supports a pairwise failover model. As shown, each node includes respective active maps (e.g., active map 541*a* and active map 541*b*) and sets of disks (in this case, ten disks) they can talk to. The nodes may partition the disks among themselves as aggregates (e.g., data aggregate 520*a* and data aggregate 520*b*) and at steady state both nodes will work on their own subset of disks representing a one or more RAID groups (in this case, four data disks and one parity disk, forming a single RAID group). A RAID layer or subsystem (not shown) of a storage operating system (not shown) of each node may present respective separate and independent PVBN spaces (e.g., PVBN space 540*a* and PVBN space 540*b*) to a file system layer (not shown) of the node.

In this example, therefore, data aggregate 520*a* has visibility only to a first PVBN space (e.g., PVBN space 540*a*) and data aggregate 520*b* has visibility only to a second PVBN space (e.g., PVBN space 540*b*). When data is stored to volume 530*a* or 530*b*, it is striped across the subset of disks that are part of data aggregate 520*a*; and when data is stored to volume 530*c* or 530*d*, it is are striped across the subset of disks that are part of data aggregate 520*b*. Active map 541*a* is a data structure (e.g., a bit map with one bit per PVBN) that that identifies the PVBNs within PVBN space 540*a* that are in use by data aggregate 520*a*. Similarly, active map 541*b* is a data structure (e.g., a bit map with one bit per PVBN) that that identifies the PVBNs within PVBN space 540*b* that are in use by data aggregate 520*b*.

As can be seen, for any given disk, the entire disk is owned by a particular aggregate and the aggregate file system is only visible from one node. Similarly, for any given RAID group, the available storage space of the entire RAID group is usable only by a single node. There are various other disadvantages to the architecture shown in FIG. 5. For example, moving a volume from one aggregate to another requires copying of data (e.g., reading all the blocks used by the volume and writing them to the new location), with an elaborate handover sequence between the aggregates involved. Additionally, there are scenarios in which one data aggregate may run out of storage space while the other still has plentiful free storage space, resulting in ineffective usage of the storage space provided by the disks. While the size of the PVBN space of an aggregate may be increased, doing so typically requires an administrative user to monitor the storage space on each node-level aggregate and add one or more disks and/or RAID groups to the aggregate. As described further below with reference to FIG. 6, with DEFSs storage space is added to a common pool of storage referred to herein as a "storage pod" and space is available for consumption by any DEFS in the cluster, thereby making space management much simpler and facilitating the automatic balancing of storage space without administrator involvement.

Example Distributed System Architecture Providing Disaggregated Storage

Before getting into the details of a particular example, various properties, constructs, and principles relating to the use and implementation of DEFSs will now be discussed. As noted above, it is desirable to make the global PVBN space of the entire storage pool available on each DEFS of a data pod, which may include one or more clusters. This feature facilitates the performance of, among other things, instant copy-free moves of volumes from one DEFS to another, for example, in connection with performing load balancing. Creating clones on remote nodes for load balancing is yet another benefit. With a global PVBN space, support for global data deduplication can also be supported rather than deduplication being limited to node-level aggregates.

It is also beneficial, in terms of performance, to avoid the use of access control mechanisms, such as locks, to coordinate write accesses and write allocation among nodes generally and DEFSs specifically. Such access control mechanisms may be eliminated by specifying, at a per-DEFS level, those portions of the disaggregated storage of the storage pod to which a given DEFS has exclusive write access. For example, as described further below, a DEFS may be limited to use of only the AAs associated with (assigned to or owned by) the DEFS for performing write allocation and write accesses during a CP. Advantageously, given the visibility into the entire global PVBN space, reads can be performed by any DEFS of the cluster from all the PVBNs in the storage pod.

Each DEFS of a given cluster (or data pod, as the case may be) may start at its own super block. As shown and described with reference to FIG. 6, a predefined AA (e.g., the first AA) in storage pod may be dedicated for super blocks. In one embodiment, a set of RAID stripes within the predefined super block AA (e.g., the first AA of the storage pod) may be dedicated for super blocks. In this predefined super block AA, ownership may be specified at the granularity of a single RAID stripe instead of at the AA granularity of multiple RAID stripes representing one or more GB (e.g., between approximately 1 GB and 10 GB) of storage space. The location of a super block of a given DEFS can be mathematically derived using an identifier (a DEFS ID) associated with the given DEFS. Since the RAID stripe is already reserved for a super block, it can be replicated on N disks.

Each DEFS has AAs associated with it, which may be thought of conceptually as the DEFS owning those AAs. In one embodiment, AAs may be tracked within an AA map and persisted within the DEFS filesystem. An AA map may include the DEFS ID in an AA index. While AA ownership information regarding other DEFSs in the cluster may be cached in the AA map of a given DEFS, which may be useful during the PVBN free path, for example, to facilitate freeing of PVBNs of an AA not owned by the given DEFS (which may arise in situations in which partial AAs are donated from one DEFS to another), the authoritative source information regarding the AAs owned by a given DEFS may be presumed to be in the AA map of the given DEFS.

In support of avoiding storage silos and supporting the more fluid use of disk space across all nodes of a cluster, DEFSs may be allowed to donate partially or completely free AAs to other DEFSs.

Each DEFS may have its own label information kept in the file system. The label information may be kept in the super block or another well-known location outside of the file system.

In various examples, there can be multiple DEFSs on a RAID tree. That is, there may be a many-to-one association between DEFSs and a RAID tree, in which each DEFS may have a reference on the RAID tree. The RAID tree can still have multiple RAID groups. In various examples described herein, it is assumed the PVBN space provided by the RAID tree is continuous.

It may be helpful to have a root DEFS and a data DEFS that are transparent to other subsystems. These DEFSs may be useful for storing information that might be needed before the file system is brought online. Examples of such information may include controller (node) failover (CFO) and storage failover (SFO) properties/policies. HA is one example of where it might be helpful to bring up a controller (node) failover root DEFS first before giving back the storage failover data DEFSs. HA coordination of bringing down a given DEFS on takeover/giveback may be handled by the file system (e.g., WAFL) since the RAID tree would be up until the node is shutdown.

DEFS data structures (e.g., DEFS bit maps at the PVBN level, such as active maps and reference count (refcount) maps) may be sparse. That is, they may represent the entire global PVBN space, but only include valid truth values for PVBNs of AAs that are owned by the DEFS with which they are associated. When validation of these bit maps is performed by or on behalf of a particular DEFS, the bits should be validated only for the AA areas owned by the DEFS. When using such sparce data structures, to get the complete picture of the PVBN space, the data structures in all the nodes should be taken into consideration. While various DEFS data structures may be discussed herein as if they were separate metafiles, it is to be appreciated, given the visibility by each node into the entire global PVBN space, one or more of such DEFS data structures may be represented as cluster-wide metafiles. Such a cluster-wide metafile may be persisted in a private inode space that is not accessible to end users and the relevant portions for a particular DEFS may be located based on the DEFS ID of the DEFS, for example, which may be associated with the appropriate inode (e.g., an L0 block). Similarly, the entirety of such a cluster-wide metafile may be accessible based on a cluster ID, for example, which may be associated with a higher-level inode in the hierarchy (e.g., an L1 block). In any event, each node should generally have all the information it needs to work independently until and unless it runs out of storage space or meets a predetermined or configurable threshold of a storage space metric (e.g., a free space metric or a used space metric), for example, relative to the other nodes of the cluster. At that point, as described further below, as part of a space monitoring and/or a space balancing process, the node may request a portion of AAs of DEFSs owned by one or more of such other nodes be donated to increase the useable storage space of one or more DEFSs of the node at issue.

Figure 6A:
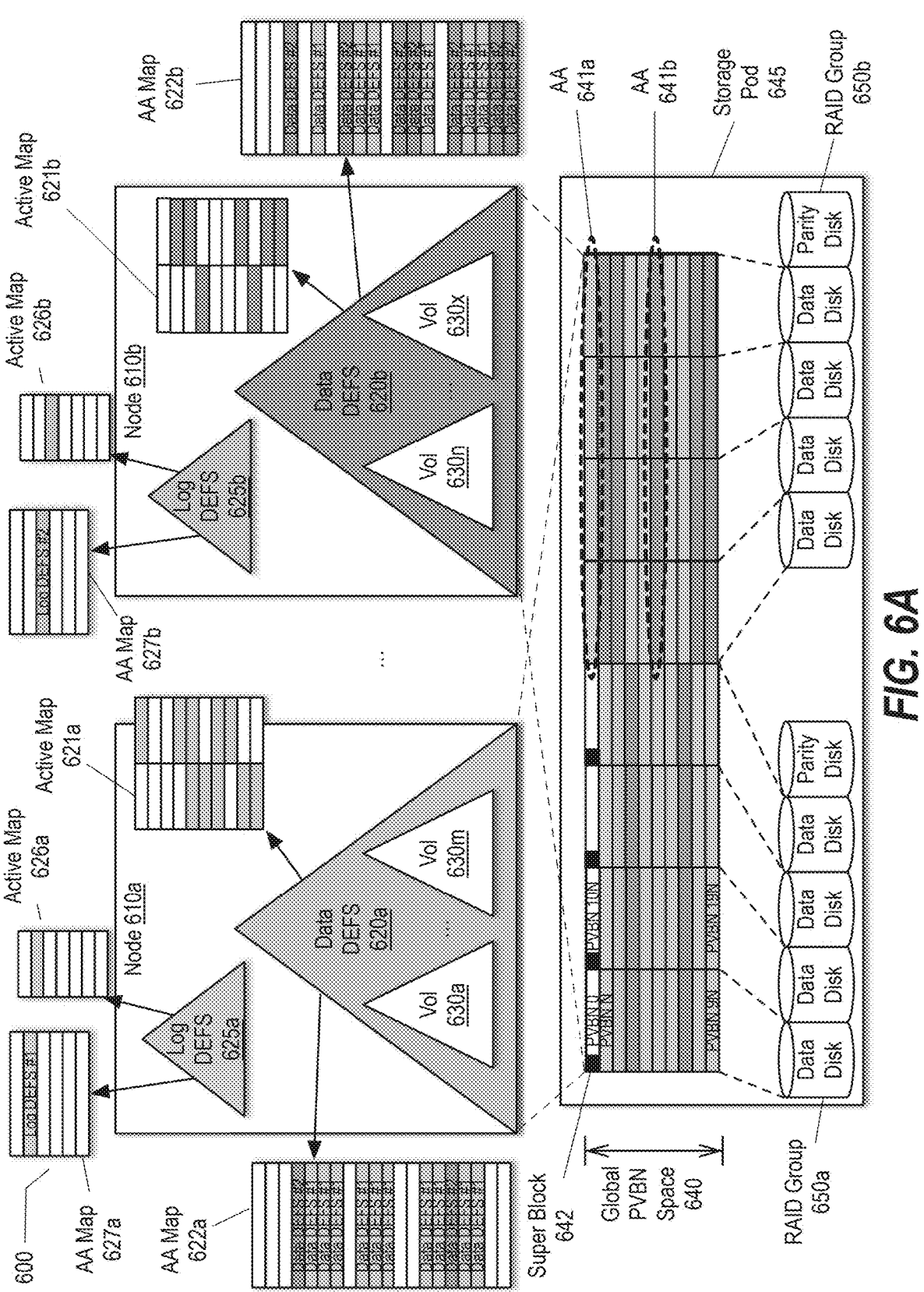
FIG. 6A is a block diagram illustrating a distributed storage system architecture that provides disaggregated storage in accordance with an embodiment of the present disclosure.

FIG. 6A is a block diagram illustrating a distributed storage system architecture 600 that provides disaggregated storage in accordance with an embodiment of the present disclosure. Various architectural advantages of the proposed distributed storage system architecture and mechanisms for providing and making use of disaggregated storage include, but are not limited to, the ability to perform automatic space balancing among DEFSs, perform elastic node growth and shrinkage for a cluster, perform elastic storage growth of the storage pod, perform zero-copy file and volume move (migration), perform distributed RAID rebuild, achieve HA cost reduction using volume rehosting, create remote clones, and perform global data deduplication.

In the context of the present example, the nodes (e.g., node 610a and 610b) of a cluster, which may represent a data pod or include multiple data pods, each include respective data dynamically extensible file systems (DEFSs) (e.g., data DEFS 620a and data DEFS 620b) and respective log DEFSs (e.g., log DEFS 625a and log DEFS 625b). In general, data DEFSs may be used for persisting data on behalf of clients (e.g., client 180), whereas log DEFSs may be used to maintain an operation log or journal of certain storage operations within the journaling storage media that have been performed since the last CP.

It should be noted that while for simplicity only two nodes, which may be configured as part of an HA pair for fault tolerance and nondisruptive operations, are shown in the illustrative cluster depicted in FIG. 6A, there may be one or more additional nodes in a given cluster. For example, there may be multiple HA pairs within a cluster (or a data pod of the cluster, which may represent a mechanism to limit the fault domain). As such, the description of this two-node cluster should be taken as illustrative only. Furthermore, while in some examples HA may be achieved by defining pairs of nodes within a cluster as HA partners (e.g., with one node designated as the primary node and the other designated as the secondary), in alternative examples any other node within a cluster may be allowed to step in after a failure of a given node without defining HA pairs.

As discussed above, one or more volumes (e.g., volumes 630a-m and volumes 630n-x) or LUNs (not shown) may be created by or on behalf of customers for hosting/storing their enterprise application data within respective DEFSs (e.g., data DEFSs 620a and 620b).

While additional data structures may be employed, in this example, each DEFS is shown being associated with respective AA maps (indexed by AA ID) and active maps (indexed by PVBN). For example, log DEFS 625a may utilize AA map 627a to track those of the AAs within a global PVBN space 640 of storage pod 645 (which may be analogous to storage pod 145) that are owned by log DEFS 625a and may utilize active map 626a to track at a PVBN level of granularity which of the PVBNs of its AAs are in use; log DEFS 625b may utilize AA map 627b to track those of the AAs within the global PVBN space 640 that are owned by log DEFS 625b and may utilize active map 626b to track at a PVBN level of granularity which of the PVBNs of its AAs are in use; data DEFS 620a may utilize AA map 622a to track those of the AAs within the global PVBN space 640 that are owned by data DEFS 620a and may utilize active map 621a to track at a PVBN level of granularity which of the PVBNs of its AAs are in use; and data DEFS 620b may utilize AA map 622b to track those of the AAs within the global PVBN space 640 that are owned by data DEFS 620b and may utilize active map 621b to track at a PVBN level of granularity which of the PVBNs of its AAs are in use.

In this example, each DEFS of a given node has visibility and accessibility into the entire global PVBN address space 640 and any AA (except for a predefined super block AA 642) within the global PVBN address space 640 may be assigned to any DEFS within the cluster. By extension, each node has visibility and accessibility into the entire global PVBN address space 640 via its DEFSs. As noted above, the respective AA maps of the DEFSs define which PVBNs to which the DEFSs have exclusive write access. AAs within the global PVBN space 640 shaded in light gray, such as AA 641a, can only be written to by node 610a as a result of their ownership by or assignment to data DEFS 620a. Similarly, AAs within the global PVBN space 640 shaded in dark gray, such as AA 641b, can only be written to by node 610b as a result of their ownership by or assignment to data DEFS 620b.

Returning to super block 642, it is part of a super block AA (or super AA). In the context of FIG. 6A, the super AA is the first AA of storage pod 645. The super AA is not assigned to any DEFS (as indicated by its lack of shading). The super AA may have an array of DEFS areas which are dedicated to each DEFS and can be indexed by a DEFS ID. The DEFS ID may start at index 1 and in the context of the present example includes four super block and four DEFS label blocks. The DEFS label can act as a RAID label for the DEFS and can be written out of a CP and can store information that needs to be kept outside of the file system. In a pairwise HA configuration, two super blocks and two DEFS label blocks may be used by the hosting node and the other two may be used by the partner node on takeover. Each of these special blocks may have their own separate stripes.

In the context of the present example, it is assumed after establishment of the disaggregated storage within the storage pod 645 and after the original assignment of ownership of AAs to data DEFS 620a and data DEFS 620b, some AAs have been transferred from data DEFS 620a to data DEFS 620b and/or some AAs have been transferred from data DEFS 620b to data DEFS 620a. As such, the different shades of grayscale of entries within the AA maps are intended to represent potential caching that may be performed regarding ownership of AAs owned by other DEFSs in the cluster. For example, assuming ownership of a partial AA has been transferred from data DEFS 620a to data DEFS 620b as part of an ownership change performed in support of space balancing, when data DEFS 620a would like to free a given PVBN (e.g., when the given PVBN is no longer referenced by data DEFS 620a a result of data deletion or otherwise), data DEFS 620a should send a request to free the PVBN to the new owner (in this case, data DEFS 620b). This is due to the fact that in various embodiments, only the current owner of a particular AA is allowed to perform any modify operations on the particular AA.

Those skilled in the art will appreciate disaggregation of the storage space as discussed herein can be leveraged for cost-effective scaling of infrastructure. For example, disaggregated storage allows more applications to share the same underlying storage infrastructure. Given that each DEFS represents an independent file system, the use of multiple of such DEFSs combine to create a cluster-wide distributed file system since all the DEFSs within a cluster share a global PVBN space (e.g., global PVBN space 640). This provides the unique ability to independently scale each independent DEFS as well as enables fault isolation and repair in a manner different from existing distributed file systems.

Figure 6B:
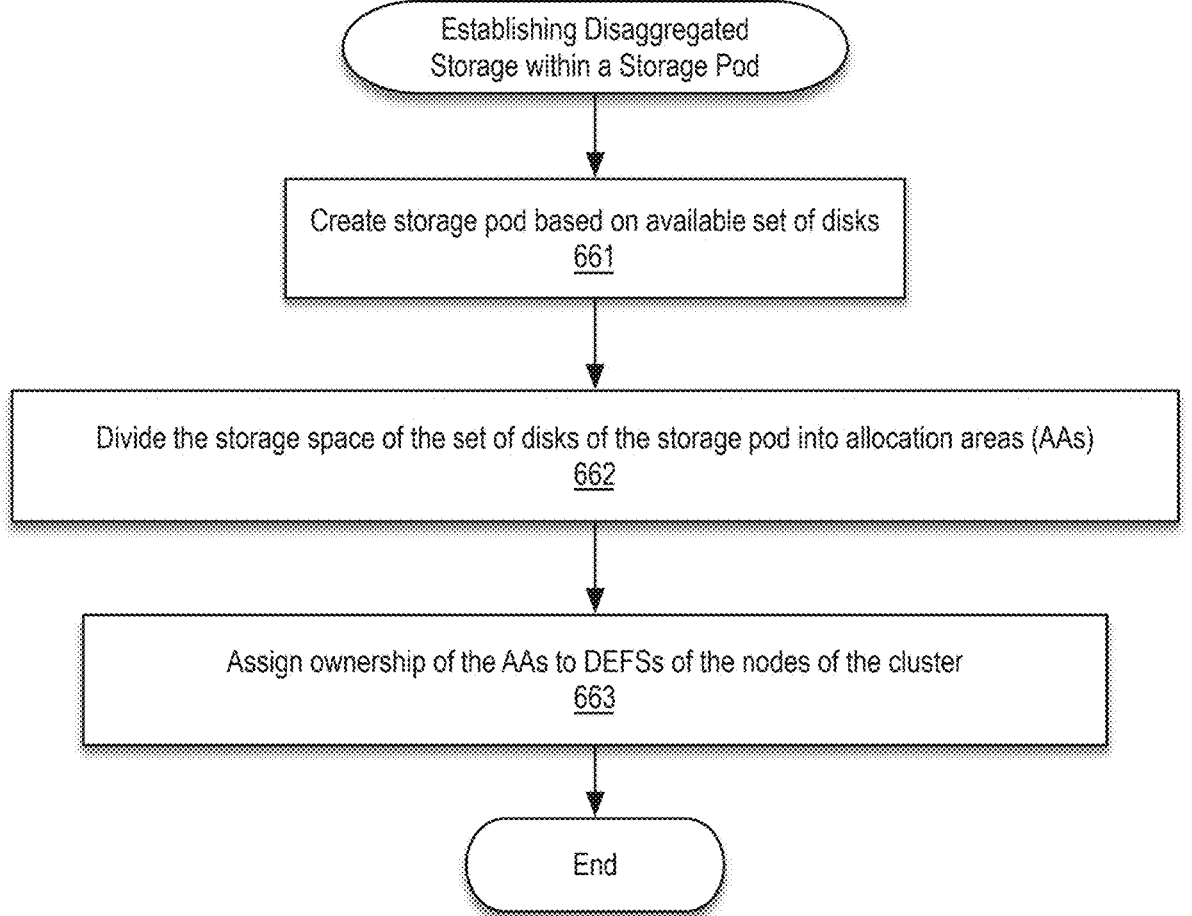
FIG. 6B is a high-level flow diagram illustrating operations for establishing disaggregated storage within a storage pod in accordance with an embodiment of the present disclosure.

Additional aspects of FIG. 6A will now be described in connection with a discussion of FIG. 6B, which represents a high-level flow diagram illustrating operations for establishing disaggregated storage within a storage pod (e.g., storage pod 645). The processing described with reference to FIG. 6B, may be performed by a combination of a file system (e.g., file system 360) and a RAID system (e.g., RAID system 380), for example, during or after an initial boot up.

At block 661, the storage pod is created based on a set of disks made available for use by the cluster. For example, jobs may be executed by a management plane of the cluster to create the storage pod and assign the disks to the cluster. Depending on the implementation and the deployment environment (e.g., on-prem versus cloud), the disks may be associated with of one or more disk arrays or one or more storage shelves or persistent storage in the form of cloud volumes provided by a cloud provider from a pool of storage devices within a cloud environment. For simplicity, cloud volumes may also be referred to herein as "disks." The disks may be HDDs or SSDs.

At block 662, the storage space of the set of disks may be divided or partitioned into uniform-sized AAs. The set of disks may be grouped to form multiple RAID groups (e.g., RAID group 650*a* and 650*b*) depending on the RAID level (e.g., RAID 4, RAID 5, or other). Multiple RAID stripes may then be grouped to form individual AAs. As noted above, an AA (e.g., AA 641*a* or AA 641*b*) may be a large chunk representing one or more GB of storage space and preferably accommodates multiple SSD erase blocks work of data. In one embodiment, the size of the AAs is tuned for the file system. The size of the AAs may also take into consideration a desire to reduce the need for performing space balancing to minimize the need for internode (e.g., East-West) communications/traffic. In some examples, the size of the AAs may be between about 1 GB to 10 GB. As can be seen in FIG. 6A, dividing the storage pod 645 into AAs allows available storage space associated with any given disk or any RAID group to be used across many/all nodes in the cluster without creating silos of space in each node. For example, at the granularity of an individual AA, available storage space within the storage pod 645 may be assigned to any given node in the cluster (e.g., by way of the given node's DEFS(s)). For example, in the context of FIG. 6A, AA 641*a* and the other AAs shaded in light gray are currently assigned to (or owned by) data DEFS 620*a* (which has a corresponding light gray shading). Similarly, AA 641*b* and the other AAs shaded in dark gray are currently assigned to (or owned by) data DEFS 620*b* (which has a corresponding light gray shading).

At block 663, ownership of the AAs is assigned to the DEFSs of the nodes of the cluster. According to one embodiment, an effort may be made to assign groups of consecutive AAs to each DEFS. Initially, the distribution of storage space represented by the AAs assigned to each type of DEFS (e.g., data versus log) may be equal or roughly equal. Over time, based on differences in storage consumption by associated workloads, for example, due to differing write patterns, ownership of AAs may be transferred among the DEFSs accordingly.

As a result, of creating and distributing the disaggregated storage across a cluster in this manner, all disks and all RAID groups can theoretically to be accessed concurrently by all nodes and the issue discussed with reference to FIG. 5 in which the entirety of any given disk and the entirety of any given RAID group is owned by a single node is avoided.

Figure 7:
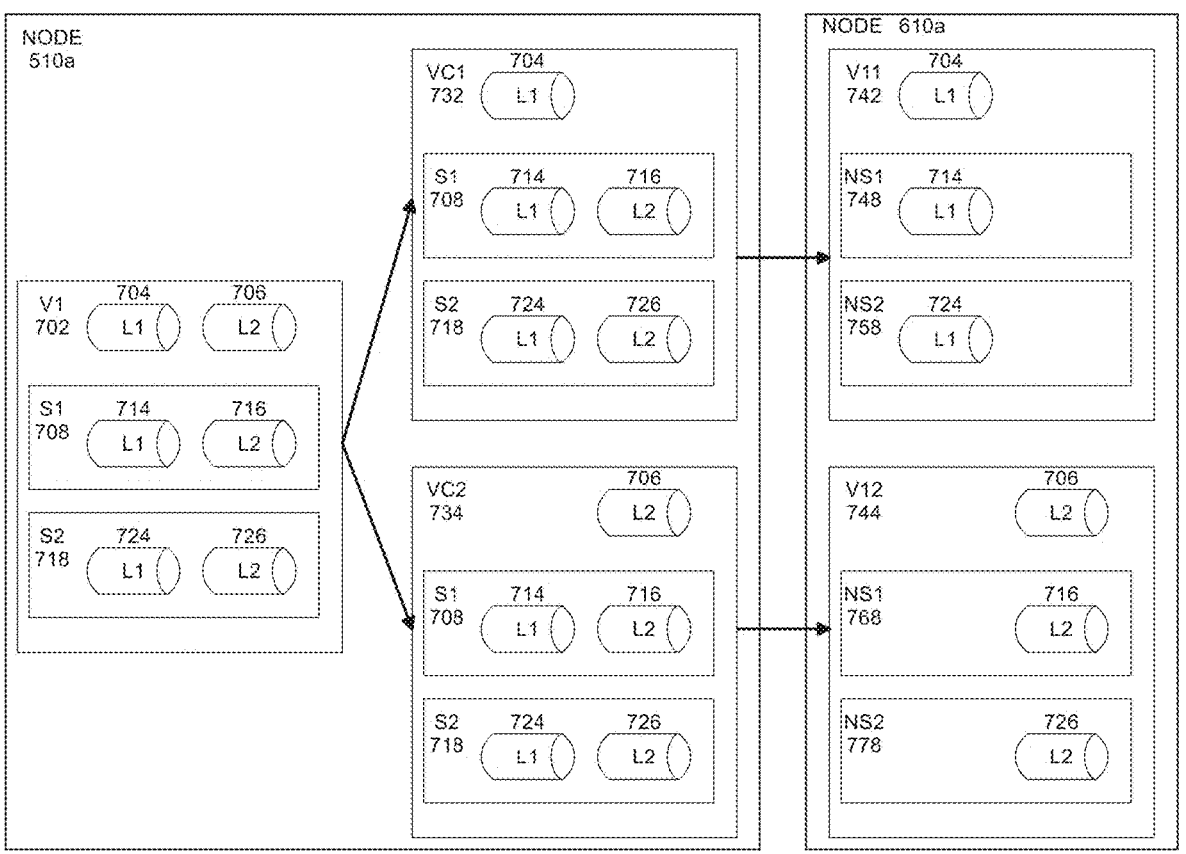
FIG. 7 is a block diagram illustrating data migration using volume clones in accordance with an embodiment of the present disclosure.

FIG. 7 is a block diagram illustrating data migration using volume clones in accordance with an embodiment of the present disclosure. FIG. 7 shows an example node from the system shown in FIG. 5, such as node 510*a*, and an example node from the system shown in FIG. 6A, such as node 610*a*. Node 510*a* includes at least one volume, such as volume V1 702. In the example shown in FIG. 7, V1 702 includes data referenced by LUN 1 (L1) 704 and data referenced by LUN 2 (L2) 706. In other examples, other numbers of LUNs may be present in V1 702. Further, the example shows that V1

702 currently includes two snapshots, although in other examples other numbers of snapshots may be present in V1 702. Thus, V1 702 includes snapshot S1 708 and snapshot S2 718. S1 708 includes copies of data referenced by L1 714 and data referenced by L2 716. S2 718 includes copies of data referenced by L1 724 and data referenced by L2 726.

When transitioning from the distributed storage system shown in FIG. 5 to the distributed storage system having a disaggregated storage architecture shown below in FIG. 6A, data migration may be performed according to one of the embodiments described herein.

The present disclosure splits the multiple-LUN volume into multiple single-LUN volumes. The technique of the present disclosure involves considering the LUN name as an argument (e.g., input data) to a clone creation workflow. This is followed by quiescing the selected LUN on the parent volume before modifying the snapshot for clone creation. Further, a modification is done in the clone mount path to promote the selected LUN on the clone volume. Thereafter, necessary modifications in the clone mount path may be performed to delete the unwanted LUNs.

First, data migration includes cloning a multiple-LUN flexible volume, such as V1 702, into multiple single-LUN flexible volumes, such as volume clone 1 (VC1 732) and volume clone 2 (VC2) 734, on node 510*a*.

In an embodiment, cloning a multiple-LUN flexible volume into multiple single-LUN flexible volumes may be performed using a flexible volume clone process. The flexible volume clone process may be utilized for exporting a single LUN from a parent volume to a clone volume in a non-disruptive manner. As used herein, the flexible volume clone technique creates a read/write (R/W) copy of a flexible volume. A flexible volume clone may be realized as a transparent writable layer in front of a snapshot, since a flexible volume clone may be initialized with a snapshot copy and updated directly and continuously thereafter. The flexible volume clone shares common data with its parent flexible volume. When the parent flexible volume or the flexible volume clone overwrites some of the common data, the new data is visible only in the volume that made the change. In an embodiment, the flexible volume clone may be created as a point-in-time "copy" of a snapshot of the parent flexible volume. The parent flexible volume is not copied into the flexible volume clone, but the parent snapshot is "pointed" to by the flexible volume clone. In an embodiment, volume cloning is nearly instantaneous, as compared to volume copying, which typically consumes significant time and computing resources, depending on the size of the parent flexible volume.

In the clone volume mount path, the LUN is promoted from a parent volume (e.g., V1 702) to one or more clone volumes (e.g., VC1 732 and VC2 734) for providing client access. Further, the snapshots inherited from the parent volume (e.g., S1 708 and S2 718) are preserved in one or more clone volumes. Thereafter, all the unwanted LUNs are deleted, apart from the LUNs being promoted on one or more clone volumes. For example, data referenced by L2 706 may be deleted from VC1 732, and data referenced by L1 704 may be deleted from VC2 734.

Next, new volumes may be created on a node in system shown in FIG. 6A, such as node 610*a*. A new volume is created on node 610*a* for each flexible clone volume created on node 510*a*. For example, volume V11 742 may be created on node 610*a* corresponding to VC1 732 on node 510*a*, and volume V12 744 may be created on node 610*a* corresponding to VC2 734 on node 510*a*.

After the new volumes have been created on node 610*a*, data from the clone volumes may be copied to the new volumes. For example, L1 704 may be copied to V11 742 and L2 706 may be copied to V12 744. Snapshot data may be selectively copied from the clone volumes to the new volumes. For example, data for L1 714 of S1 708 on VC1 732 may be copied to new snapshot 1 (NS1) 748 on VC11 742, data for L1 724 of S2 718 on VC1 732 may be copied to new snapshot 2 (NS2) 758 on VC11 742, data for L2 716 of S1 708 on VC2 734 may be copied to new snapshot 1 (NS1) 768 on VC12 744, and data for L2 726 of S2 718 on VC2 734 may be copied to new snapshot 2 (NS2) 778 on VC12 744.

In an embodiment, an asynchronous snapshot mirror relationship may be established and then a Single File Restore (SFR) technique may be used to restore the snapshot S1 708 on to the destination volume (e.g., V11 742). In an embodiment, while the mirror relationship is a volume level relationship, an objective is to split LUNs. To achieve SFR with storage efficiency, the process described herein iterates through all existing snapshots between VC1 732 and V11 742, for example, and the following steps may be performed. A single LUN per snapshot may be transferred where the LUN of focus is defined by V11 742. After the transfer, a snapshot may be created with an ID that matches that of the source of the transfer. This enables the incremental SFR capability. These steps may be repeated for the next set of snapshots.

While restoring the snapshot S1 to the destination volume, a logical replication engine (LRE) function may be used so that improved storage efficiency (such as deduped blocks) may be achieved on the source volume (e.g., VC1 732), and will be preserved on the destination volume. In this way, the size of the data transferred on to the destination volume may be minimized. For example, assume snapshot S1 708 has a size of 10 gigabytes (GBs) of logical data and 1 GB physical data. This will have a 10:1 savings due to improved storage efficiency achieved via deduplication. When this data is transferred to destination volume, the 10:1 savings must be preserved during the transfer as well as on the destination volume. In an embodiment, this may be achieved using LRE.

An asynchronous snapshot mirror relationship may be established via synchronous replication between the newly created clone volumes (e.g., VC1 732 and VC2 734) on node 510*a* and the newly created volumes (e.g., VC11 742 and VC12 744) on node 610*a*. In an embodiment, the asynchronous snapshot mirror relationship may be initially established to provide minutes to hours recovery point objective (RPO) granularity. The asynchronous snapshot mirror relationship may then be switched to an active synchronous snapshot mirror relationship providing zero recovery point objective (RPO) and near RPO granularity.

The snapshot mirror relationships are done in a two-step process to recreate the snapshot hierarchy on the destination volume similarly to the source volume. On the source volume, for example snapshot S1 708 is created at time T1 and snapshot S2 718 is created at time T2, then on the destination volume the snapshot must be created in the same order (that is, first new snapshot NS1 748 is created first, followed by second new snapshot NS2 758). Thus, the snapshot hierarchy on the source volume is S1→S2, and the snapshot hierarchy on the destination volume is NS1→NS2. In this way, the snapshot hierarchy is recreated on the destination volume. In first step, an asynchronous relationship is established to transfer only the snapshot data first. After the snapshot hierarchy is created on destination volume similarly to the source volume, the asynchronous relationship may be transitioned to the synchronous relationship to transfer the active file system data.

In an embodiment, establishing the snapshot mirror relationship includes engaging sync-based cutover processing between the two volumes (e.g., a clone volume such as VC1 732 and a new volume such as V11 742). After transferring all the snapshots to node 610*a*, the relationship is identified to be in a synchronous mode. Thus, all the updates to LUNs in node 510*a* are replicated to LUNs in node 610*a*. In an embodiment, the sync processing creates a new snapshot to go through transition phase (e.g., from asynchronous to a synchronous steady state). Thereafter, a steady state of synchronized replication is observed.

Finally, a non-disruptive cross cluster migration of data logical interface failovers (LIFs) for a storage virtual machine (SVM) (e.g., tied to a virtual server (vserver)) and/or worldwide port numbers (e.g., for Fibre Channel) may be performed. Once the clone volumes on node 510*a* enter the synchronous mode, LIFs may be used for non-disruptive migration to node 610*a*.

FIG. 8 is a flow diagram illustrating operations for performing data migration using volume clones in accordance with an embodiment of the present disclosure. In an embodiment, these operations may be performed at least in part by storage OS 210. Process 800 begins at block 802 with cloning a multiple-LUN volume into multiple single-LUN volumes on a first node. For example, multiple-LUN volume V1 702 may be cloned into multiple single-LUN volumes VC1 732 and VC2 734 on node 510*a*. At block 804, one or more new volumes may be created on a second node based at least in part on the cloned single-LUN volumes of the first node. For example, new volumes V11 742 and V12 744 may be created on node 610*a* based at least in part on cloned single-LUN volumes VC1 732 and VC2 734 of node 510*a*. At block 806, snapshot data from the cloned single-LUN volumes may be selectively copied from the first node to the new volumes on the second node. For example, snapshot data L1 714 from snapshot S1 708 in VC1 732 on node 510*a* may be copied to NS1 748 in V11 742 on node 610*a*, snapshot data L1 714 from snapshot S2 718 in VC1 732 on node 510*a* may be copied to NS2 758 in V11 742 on node 610*a*, snapshot data L2 716 from snapshot S1 708 in VC2 734 on node 510*a* may be copied to NS1 768 in V12 744 on node 610*a*, and snapshot data L2 716 from snapshot S2 718 in VC2 734 on node 510*a* may be copied to NS2 778 in V12 744 on node 610*a*.

At block 808, an asynchronous snapshot mirror relationship may be established between the cloned single-LUN volumes on the first node and the new volumes on the second node. For example, an asynchronous snapshot mirror relationship may be established between VC1 732 and V11 742 and between VC12 734 and V12 744. At block 810, the asynchronous snapshot mirror relationships may be switched to active synchronous snapshot mirror relationships.

At block 812, the cloned single-LUN volumes may be synchronized with the new volumes. For example, data associated with L1 704 and L2 706 may be copied to V11 742 and V12 734, respectively. When the snapshot mirror relationship was in asynchronous mode, embodiments focus on transferring the data captured in snapshots. By transitioning the snapshot mirror relationship to synchronous mode, all the active file system data may now be transferred so that the source volumes and destination volumes have mirror copies of the data.

At block 814, non-disruptive cross cluster migration of data logical interface failovers and port numbers may be performed from the cloned single-LUN volumes to the new volumes. For example, non-disruptive cross cluster migration of data logical interface failovers and port numbers may be performed from VC1 732 to V11 742 and from VC2 732 to V12 744. Finally, client access to volumes/LUNs may be disconnected on the source node and made available on the destination node. This data LIFs migration is again done in a non-disruptive manner (e.g., with no down time). After this action is performed, the client will not be able to access the volumes/LUNs via the source node. All access control is now made available from the destination node.

Embodiments of the present disclosure provide at least several advantages and meet various requirements. Embodiments are non-disruptive, ensuring that data access continuity is ensured, and no application downtime should be noticed while migrating LUNs between two clusters. Embodiments fully support the object model of the distributed storage system having a disaggregated storage architecture shown in FIG. 6, including LUN management is preserved and the object model requirement of one LUN per volume is retained on the destination cluster after the data migration activity. Embodiments conform to a requirement of no additional space being consumed during preparation of the LUN on the source cluster, and space is not bloated on the destination cluster after data migration is complete. Embodiments preserve source data sets "as is" after migration. Embodiments preserve the inventory of snapshots. All the previous snapshots within a hierarchy (e.g., S1, S2, NS1, . . . , etc.) are retained on the destination cluster after data migration is complete. Embodiments preserve storage efficiency without bloating up the space on the destination cluster. Embodiments support efficient network usage, with the amount of data transferred over the network for purposes of data migration being defined in the order of magnitude with respect to a source dataset. Embodiments support LUN availability in case of data migration failures. A LUN is allowed to be restored if the data migration fails.

Embodiments of the present disclosure include various steps, which have been described above. The steps may be performed by hardware components or may be embodied in machine-executable instructions, which may be used to cause one or more processing resources (e.g., one or more general-purpose or special-purpose processors) programmed with the instructions to perform the steps. Alternatively, depending upon the implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors (e.g., processors 222*a*-*b*) within a single computer) and storage systems containing or having network access to computer program(s) coded in accordance with various methods described herein, and the method steps associated with embodiments of the present disclosure may be accomplished by modules, routines, subroutines, or subparts of a computer program product.

The term "storage media" as used herein refers to any non-transitory media that stores data or instructions that cause a machine to operate in a specific fashion. Such storage media may comprise non-volatile media or volatile media. Non-volatile media includes, for example, optical, magnetic or flash disks, such as storage devices (e.g., local storage 230). Volatile media includes dynamic memory, such as main memory (e.g., memory 224). Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (e.g., system bus 223). Transmission media can also take the form of acoustic or light waves, such as those generated during radio-wave and infra-red data communications.

Various forms of media may be involved in carrying one or more sequences of one or more instructions to the one or more processors for execution. For example, the instructions may initially be carried on a magnetic disk or solid-state drive of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on bus. Bus carries the data to main memory (e.g., memory 224), from which the one or more processors retrieve and execute the instructions. The instructions received by main memory may optionally be stored on storage device either before or after execution by one or more processors.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
cloning a multiple-logical unit number (LUN) volume into a plurality of cloned single-LUN volumes on a first storage node of a computing system;
creating a plurality of new volumes on a second storage node of the computing system based at least in part on the plurality of cloned single-LUN volumes;
selectively copying snapshot data from the plurality of cloned single-LUN volumes to the plurality of new volumes;
establishing snapshot mirror relationships between the plurality of cloned single-LUN volumes and the plurality of new volumes;
synchronizing the plurality of cloned single-LUN volumes and the plurality of new volumes; and
performing a migration of data logical interface failovers (LIFs) from the plurality of cloned single-LUN volumes to the plurality of new volumes.

2. The method of claim 1, wherein the snapshot mirror relationships comprise asynchronous snapshot mirror relationships and further comprising switching the asynchronous snapshot mirror relationships to active synchronous snapshot mirror relationships.

3. The method of claim 2, wherein the active synchronous snapshot mirror relationships provide zero recovery point objective (RPO) granularity.

4. The method of claim 1, wherein the migration comprises a non-disruptive cross cluster migration.

5. The method of claim 1, wherein the computing system comprises a first distributed storage system to store the first storage node and a second distributed storage system having a disaggregated storage architecture to store the second storage node.

6. The method of claim 5, wherein the second distributed storage system having the disaggregated storage architecture supports only one LUN per volume.

7. The method of claim 1, further comprising performing a migration of port numbers from the plurality of cloned single-LUN volumes to the plurality of new volumes.

8. The method of claim 1, comprising cloning the multiple-LUN volume into the plurality of cloned single-LUN volumes using a flexible volume cloning process for repeatedly and non-disruptively exporting a single LUN from a parent volume to a clone volume on the first storage node.

9. The method of claim 1, wherein a selected one of the plurality of cloned single-LUN volumes corresponds to a selected one of the plurality of new volumes.

10. A non-transitory, machine-readable medium storing instructions, which when executed by one or more processing resources of a computing system, cause the computing system to:
clone a multiple-logical unit number (LUN) volume into a plurality of cloned single-LUN volumes on a first storage node of the computing system;

create a plurality of new volumes on a second storage node of the computing system based at least in part on the plurality of cloned single-LUN volumes;
selectively copy snapshot data from the plurality of cloned single-LUN volumes to the plurality of new volumes;
establish snapshot mirror relationships between the plurality of cloned single-LUN volumes and the plurality of new volumes;
synchronize the plurality of cloned single-LUN volumes and the plurality of new volumes; and
perform a migration of data logical interface failovers (LIFs) from the plurality of cloned single-LUN volumes to the plurality of new volumes.

11. The non-transitory, machine-readable medium of claim 10, wherein the snapshot mirror relationships comprise asynchronous snapshot mirror relationships and further comprising instructions, when executed, to switch the asynchronous snapshot mirror relationships to active synchronous snapshot mirror relationships.

12. The non-transitory, machine-readable medium of claim 11, wherein the active synchronous snapshot mirror relationships provide zero recovery point objective (RPO) granularity.

13. The non-transitory, machine-readable medium of claim 10, wherein the migration comprises a non-disruptive cross cluster migration.

14. The non-transitory, machine-readable medium of claim 10, wherein the computing system comprises a first distributed storage system to store the first storage node and a second distributed storage system having a disaggregated storage architecture to store the second storage node.

15. The non-transitory, machine-readable medium of claim 14, wherein the second distributed storage system having the disaggregated storage architecture supports only one LUN per volume.

16. A computing system comprising:
one or more processing resources; and
instructions that when executed by the one or more processing resources cause the computing system to:
clone a multiple-logical unit number (LUN) volume into a plurality of cloned single-LUN volumes on a first storage node of the computing system;
create a plurality of new volumes on a second storage node of the computing system based at least in part on the plurality of cloned single-LUN volumes;
selectively copy snapshot data from the plurality of cloned single-LUN volumes to the plurality of new volumes;
establish snapshot mirror relationships between the plurality of cloned single-LUN volumes and the plurality of new volumes;
synchronize the plurality of cloned single-LUN volumes and the plurality of new volumes; and
perform a migration of data logical interface failovers (LIFs) from the plurality of cloned single-LUN volumes to the plurality of new volumes.

17. The computing system of claim 16, further comprising instructions, when executed to perform a migration of port numbers from the plurality of cloned single-LUN volumes to the plurality of new volumes.

18. The computing system of claim 16, comprising instructions to clone the multiple-LUN volume into the plurality of cloned single-LUN volumes comprises instructions, when executed, to use a flexible volume cloning process for repeatedly and non-disruptively exporting a single LUN from a parent volume to a clone volume on the first storage node.

19. The computing system of claim 16, comprising a disaggregated storage space created within a storage pod of the computing system including a group of disks containing multiple Redundant Array of Independent Disks (RAID) groups by dividing storage space of the group of disks into multiple allocation areas (AAs), the disaggregated storage space including the second storage node.

20. The computing system of claim 19, wherein the disaggregated storage space comprises a dynamically extensible file system.

\* \* \* \* \*